United States Patent [19]

Okami

[11] Patent Number: 5,424,374
[45] Date of Patent: Jun. 13, 1995

[54] HEAT CURABLE ORGANOPOLYSILOXANE COMPOSITIONS

[75] Inventor: Takehide Okami, Gunma, Japan

[73] Assignee: Shin-Etsu Chemical Co., Ltd., Tokyo, Japan

[21] Appl. No.: 300,882

[22] Filed: Sep. 6, 1994

Related U.S. Application Data

[63] Continuation-in-part of Ser. No. 128,190, Sep. 29, 1993, abandoned.

[30] Foreign Application Priority Data

Sep. 30, 1992 [JP] Japan .................... 4-285111

[51] Int. Cl.$^6$ .............................. C08G 77/38
[52] U.S. Cl. ...................... 525/478; 524/46; 525/477; 525/479; 525/100; 525/106
[58] Field of Search .......... 525/478, 479, 477, 100, 525/106; 524/46

[56] References Cited

U.S. PATENT DOCUMENTS

| | | | |
|---|---|---|---|
| 3,284,406 | 11/1966 | Nelson . | |
| 3,436,366 | 4/1969 | Modic . | |
| 3,445,420 | 5/1969 | Kookootsedes et al. . | |
| 3,532,649 | 10/1970 | Schuyler et al. . | |
| 3,699,073 | 10/1972 | Wada et al. . | |
| 4,293,677 | 10/1981 | Imai | 528/15 |
| 4,784,879 | 11/1988 | Lee et al. . | |
| 5,015,691 | 5/1991 | Lewis et al. | 525/478 |
| 5,015,716 | 5/1991 | Togashi et al. | 525/478 |
| 5,135,960 | 8/1992 | Higuchi et al. | 528/15 |
| 5,254,656 | 10/1993 | Bilgrien et al. | 525/478 |

OTHER PUBLICATIONS

Brandrup, et al. Polymer Handbook, John Wiley & Sons, New York, pp. v–55, v–56, and v–59, 2nd ed, 1975.
Encyclopedia of Polymer Science and Engineering, vol. 7, p. 538, John Wiley & Sons, New York, 1987ed.
Abstract of JP 92046962.
Abstract of JP 78041707.

*Primary Examiner*—Melvyn I. Marquis
*Attorney, Agent, or Firm*—Millen, White, Zelano & Branigan

[57] ABSTRACT

Heat curable organopolysiloxane compositions of this invention comprise (A) organopolysiloxanes with at least two alkenyl groups within the molecule, (B) capsules containing organo hydrogen polysiloxanes which comprise (B-1) organo hydrogen polysiloxanes with at least two hydrogen atoms which are bound to silicon atoms within the molecule and (B-2) a thermoplastic resin having a softening point or glass transition temperature in the range from 40° to 200° C., wherein the component (B-1) forms a single nucleus or multiple nuclei and the component (B-2) is a wall material, and (C) platinum group metallic catalysts. The said compositions contain a crosslinking agent which is encapsulated with thermoplastic resins, therefore they possess a superior stability during room temperature storage for a long time period, and the heating of the compositions forms a rapid and uniform crosslinking to prepare the cured products.

8 Claims, No Drawings

HEAT CURABLE ORGANOPOLYSILOXANE COMPOSITIONS

This application is a continuation-in-part of Application Ser. No. 08/128,190, filed Sep. 29, 1993, now abandoned.

BACKGROUND OF THE INVENTION

This invention relates to heat curable organopolysiloxane compositions which are cured through hydrosilylation. In more detail, this invention relates to heat curable organopolysiloxane compositions which possess a superior stability during storage and a rapid curability at high temperature.

Organopolysiloxane compositions of an addition type, which utilize hydrosilylation, characteristically produce few reaction by-products and the reaction proceeds rapidly with depth. Therefore, they have been utilized in a wide variety of fields as an adhesive sealing material, a potting material, a coating material for electric and electronic parts, as an adhesive gasket with a factory applied seal for construction use, and as a peelable coating material for papers and films.

However, these organopolysiloxane compositions are extremely unstable during storage. Therefore, one disadvantage is that they can not be stored with all the components in a single container. Due to this instability, the following problems arise: each of the components usually need to be stored in separate containers and two or three components of the composition must be weighed, mixed and defoamed prior to usage.

Conventional approaches proposed to solve these problems were to control the catalytic activity of the hydrosilylation catalysts, especially the platinum type catalysts.

One of the methods proposed is to utilize additives which can control the catalytic activities of the platinum type catalysts. Examples of additives are: acetylene type compounds (U.S. Pat. No. 3,445,420), organosiloxanes containing a $CH_2=CHRSiO$ unit (where R is a monovalent hydrocarbon group which does not contain unsaturated fat type hydrocarbons) (Japanese patent application Kokoku, examined, 48-10947), ionic compounds of heavy metals (U.S. Pat. No. 3,532,649), benzotriazole type compounds, and hydroperoxide compounds. However, the stability during storage achieved by the addition of these compounds is off set by a lowering in curing properties and by a lengthening of the time required for curing.

The second method is to isolate the hydrosilylation catalysts from the other reactive components of the composition until the time of heat curing. The proposed method aims to isolate the hydrosilylation catalysts, such as a 2-ethyl hexanol solution of chloroplatinic acid and platinum alkenyl siloxane catalysts, by encapsulating them as a single nucleus or multiple nuclei within thermoplastic resins with a softening point (Japanese patent application Kokoku, examined, 53-41707, Japanese patent application Kokai, laid open, 64-47442, and Japanese patent application Kokoku, examined, 4-46962).

Even with this said method, however, uniformly cured products are not easily prepared when the resin used as a wall material of the capsules has a poor compatibility with silicone. This results in good curing in the area surrounding the catalyst capsules but not in those areas distant from them. Further, when the wall material is a silicone resin which is softened and becomes compatible with silicone upon being heated, the boundary of the catalyst capsules tend to start gelation after storage at room temperature for a long time period, due to a slow releasing property specific to silicone. In addition, the absolute amount of the catalyst capsules necessary for the hydrosilylation is so small in relation to the amount of the composition, that their uniform dispersion is difficult. As a result, the formation of crosslinking does not proceed uniformly after heating, which often disadvantageously results in products containing sections of low hardness and exhibiting a large permanent deformation by compression.

Therefore, an object of this invention is to provide heat curable organopolysiloxane compositions which possess a superior stability during room temperature storage over a long time period, a high curing speed at high temperature, and the capability for uniform crosslinking.

Upon further study of the specification and appended claims, further objects and advantages of this invention will become apparent to those skilled in the art.

SUMMARY OF THE INVENTION

This invention is directed to heat curable organopolysiloxane compositions which comprise (A) organopolysiloxanes with at least two alkenyl groups within the molecule, (B) capsules having organo hydrogen polysiloxanes which comprise (B-1) organo hydrogen polysiloxanes with at least two hydrogen atoms which are bound to silicon atoms within the molecule and (B-2) a thermoplastic resin having a softening point or glass transition temperature in the range from 40° to 200° C., wherein the component (B-1) forms a single nucleus or multiple nuclei and the component (B-2) is a wall material, and (C) platinum group metallic catalysts.

DETAILED DESCRIPTION OF THE INVENTION

A remarkable characteristic of this invention, which has led the inventors to successfully achieve the said objective, is the use of capsules having therein the organo hydrogen polysiloxanes of the said component (B) as a crosslinking agent. According to the invention, heating of the compositions of this invention dissolves the wall material of the capsules of the component (B), releasing their nucleus material, organo hydrogen polysiloxane (B-1), which is a crosslinking agent. Then, crosslinking proceeds by the contact between the organo hydrogen polysiloxanes and the (A) and (C) components.

(A) Organopolysiloxanes with alkenyl groups

Organopolysiloxanes of the component (A) are the base constituent for the compositions of this invention and they consist of, at least, two alkenyl groups per molecule. These alkenyl groups bind to the silicon atoms within the molecule and they are, for example, lower alkenyl groups having for example 2 to 8 carbon atoms, such as a vinyl group, an allyl group, a methacryl group, and a hexenyl group. These alkenyl groups may exist at the end of and/or in the middle of the molecular chain.

Other organic groups besides alkenyl groups may also be bound to the silicon atoms. Examples of such organic groups are substituted or unsubstituted monovalent hydrocarbon groups of, for example, 1 to 10 carbon atoms, more desirably with 1 to 8 carbon atoms. Specific examples of such hydrocarbon groups are:

alkyl groups such as a methyl group, an ethyl group, a propyl group, and a butyl group; cycloalkyl groups such as a cyclohexyl group; aryl, for example, carbocyclic aryl, groups such as a phenyl group and a tolyl group; aralkyl groups, for example, carbocyclic aralkyl, such as a benzyl group and a phenyl ethyl group; and the above groups in which a part of or all of the organo hydrogen atoms are substituted with halogen atoms, such as a chloromethyl group and a 3, 3, 3-trifluoropropyl group.

Further, the viscosity values of these organopolysiloxanes at 25° C. should preferably be in the range from 100 to 200,000 cSt and their degrees of polymerization should also correspond to this viscosity level. A larger viscosity than this level will reduce the workability of the compositions. While a viscosity smaller than said level will result in inappropriate physical properties for the cured products.

In this invention, a single organopolysiloxane or a combination of two or more organopolysiloxanes may be used. Further, their molecular structure is desirably linear, but a partially branched type may also be applicable. Appropriate examples of the component (A), organopolysiloxanes, are representatively expressed by the equations (1) through (3).

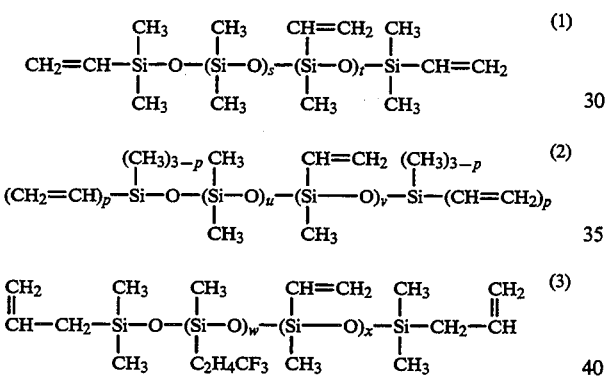

wherein p is 2 or 3; s, u and w designate positive integers; and t, v, and x express 0 or positive integers. Preferably, s+t is 50 to 3,000 and t/s is 0 to 10; u+v is 50 to 3,000 and v/u is 0 to 10 and w+x is 50 to 3,000 and x/w is 0 to 10.

(B) Capsules having organo hydrogen polysiloxanes

In this invention, the component (B) is capsules which comprise organo hydrogen polysiloxanes, the component (B-1), as a nucleus and the component (B-2), a thermoplastic resin having a softening point or glass transition temperature of from 40° to 200° C., as a wall material.

Organo hydrogen polysiloxanes of the component (B-1) function as a crosslinking agent towards component (A), organopolysiloxanes with alkenyl groups. The organo hydrogen polysiloxanes utilized here possess at least two organo hydrogen atoms bound to silicon atoms. The addition reaction between the alkenyl groups in the component (A) and the SiH groups in the component (B-1) results in adhesive curable products of rubber elastic bodies.

In these organohydrogen polysiloxanes, the organo hydrogen atoms may be bound to silicon atoms which are located at the end of and/or in the middle of the molecular chain. Further, the examples of the organic groups bound to these silicon atoms are the groups shown for said component (A) of the organopolysiloxanes, except the alkenyl groups. Such organohydrogen polysiloxanes may possess structures which are linear, branched, or cyclic, and may also be mixtures of these structures. The degree of polymerization for these organohydrogen hydrogen polysiloxanes is desirably at most 300. Appropriate examples are shown below.

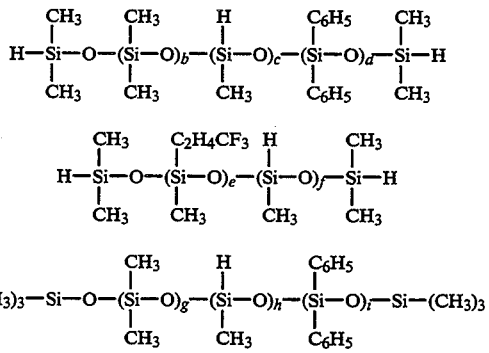

wherein, in the above equations, b, c, d, e, f, g, and i designate 0 or positive integers, and h is an integer of at least 2. Preferably b+c+d is 3 to 300, e+f is 3 to 300 and g+h+i is 3 to 300. Specific examples are:

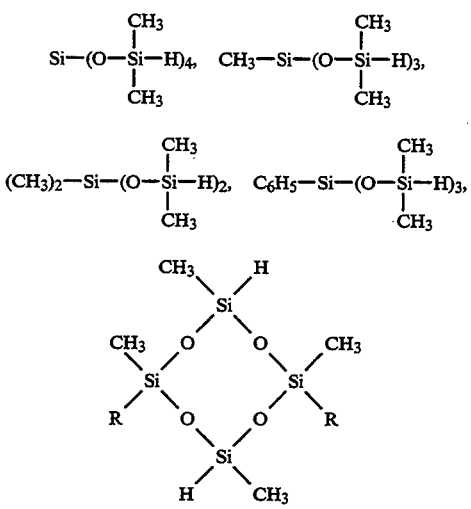

wherein R is a organo hydrogen atom, a methyl group, a propyl group or a trimethyl siloxyl group.

The amount of the organohydrogen polysiloxanes utilized should be sufficiently large enough to provide 0.6 to 6.0 organo hydrogen atoms bound to silicon atoms per one alkenyl group contained in the organopolysiloxanes of the (A) component. More desirably, this amount should be such that the molar ratio of the SiH groups to the alkenyl groups is 1.2 to 4.0.

Any resins may be applicable as the thermoplastic resins of the (B-2) component as long as they possess a softening point or glass transition temperature in the temperature region from 40° to 200° C., will not permeate the organo hydrogen polysiloxanes of the (B-1) component in the practical sense during storage, and will not dissolve into the organopolysiloxanes of the (A) component in the practical sense. The softening point is the temperature where the resin starts to flow due to its own weight or its own surface tension. This temperature can easily be determined by observing the crushed particles of the resin with a microscope while raising the temperature at a certain rate. The glass transition temperature can be measured by the method of DSC (differential scanning calorimeter). In this invention, a resin may be used as long as either its softening point or its glass transition temperature is in the range of 40° to 200° C. When the softening point and the glass transition temperature is less than 40° C., the stability of the composition during storage reduces drastically, while values higher than 200° C. will lead to an insufficient heat curing speed.

In this invention, examples of thermoplastic resins suitably utilized as the (B-2) component are silicone resins, polysilane resins, polystyrene resins, acrylic resins, and methyl cellulose resins. Among them silicone resins are most suitable due to their homogeneity within the composition upon heating. The compositions of such silicone resins are not particularly limited, as long as their softening points or glass transition temperatures are within the region described above. Most of the resins which possess siloxane skeletons as a major component can be applied. For example, the thermoplastic silicones which comprise ($Me_3SiO_{1/2}$) units and ($SiO_{4/2}$) units may be used. However silicone resins which comprise monophenyl siloxane units ($PhSiO_{3/2}$) as a major component along with diphenyl siloxane units ($Ph_2SiO$), dimethyl siloxane units ($Me_2SiO$), methyl siloxane units ($MeSiO_{3/2}$), and/or methyl vinyl siloxane units ($MeViSiO$) are more generally desirable. The silicone resins which comprise 20 to 80 mole % of $PhSiO_{3/2}$ and $MeSiO_{3/2}$ units in total, and 80 to 20 mole % of $Ph_2SiO$, $Me_2SiO$ and $MeViSiO$ units in total, are particularly suitable from the view point of their softening points (in the above, Me, Ph, and Vi designate a methyl group, a phenyl group and a vinyl group, respectively).

Such fine particles of thermoplastic capsules containing organohydrogen polysiloxanes can be prepared by chemical methods such as the interfacial polymerization method and the in-situ polymerization method, by physical-chemical methods such as the coacervation method and the in-liquid drying method, or by physical-mechanical methods such as the spray dry method. Among them, the in-liquid drying method and the spray dry method are more desirable since they provide fine particles relatively easily with a narrow particle size distribution, for example, having a size range of 1 μm to 1 mm, particularly 10 μm to 100 μm.

The fine particles of thermoplastic capsules, containing organohydrogen polysiloxanes, obtained by these methods may be used as the component (B) in the state that they are prepared. However, it is more desirable to wash them with appropriate cleaning solvents in order to eliminate the organohydrogen polysiloxanes adhering onto their surfaces. This process will result in the heat curable organopolysiloxane compositions with a superior stability during storage. The appropriate cleaning solvents are those which are capable of dissolving the organohydrogen polysiloxanes, but not the thermoplastic resins. The desirable solvents are organopolysiloxanes with low molecular weight, such as hexamethyl disiloxane and

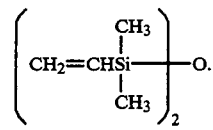

However, an advantage of this invention is that, even when a small amount of the organohydrogen polysiloxane remains after insufficient washing, it has very low concentration when dispersed into composition by compatibly mixing with the component (A) alkenyl polysiloxanes. Therefore, the formation of elastomers due to the proceeding of crosslinking at room temperature is practically restricted. This is much different from the cases where the platinum type catalysts are encapsulated.

In the capsules of the (B) component, the ratio of the component (B-1) against the component (B-2) is desirably at least 0.05 wt %, more preferably in the range from 5 to 60 wt %. When this value is less than 0.05 wt %, the ratio of the thermoplastic resins in the compositions of this invention becomes too high, which may lead to the inferior physical properties after curing.

In this invention, the amount of the component (B) is determined so that there is a sufficiently large enough amount of the said (B-1) component of organohydrogen polysiloxanes to provide 0.6 to 6.0 organo hydrogen atoms bound to silicon atoms per one alkenyl group in the (A) component.

(C) Platinum group metallic catalysts

The platinum group metallic catalysts of the component (C) are catalysts for the addition reaction between the alkenyl groups and the SiH groups, and they function as a curing promoter. Such catalysts are platinum, palladium, rhodium, or the like metals and the catalysts may be used together. In this invention, the platinum type catalysts are particularly suitable. Examples are not limited to this type, but a platinum black, solid platinum carried on alumina or silica carriers, a chloroplatinic acid, an alcohol denatured chloroplatinic acid, and complexes of chloroplatinic acid with olefins are preferred.

Concerning the use of the solid catalysts, it is also desirable to crush them or to utilize carriers with a finer particle size and a larger specific surface area in order to increase their dispersiveness. For the complexes of chloroplatinic acid with olefins, they are preferably used by dissolution into solvents such as alcohols, ketones, ethers, and hydrocarbons. When the so-called catalytically effective amount of these catalysts is used, the desired curing speed can be achieved. However, from the economic view point and in order to obtain high quality of the cured products, it is suitable to use them at the following ratio. For the catalysts which are compatible with siloxane components, such as a chloroplatinic acid, the desirable range is from 0.1 to 100 ppm (based on the amount to Pt) against the total amount of the said (A) and (B) components. On the other hand, the amount from 20 to 500 ppm (based on the amount to Pt) is suitable for the solid catalysts such as a platinum black.

Other components

The adhesive organopolysiloxane compositions of this invention are prepared by uniformly mixing the components (A) through (C). However, fillers and other additives may also be added corresponding to their applications.

For example, all the fillers which are usually employed for the addition type silicone rubber compositions are applicable. Specific examples are: a fumed silica, a precipitated silica, a treated silica with a hydrophobicity, titanium dioxide, iron oxide, aluminum oxide, zinc oxide, a quartz powder, a diatomaceous earth, calcium silicate, talc, bentonite, asbestos, glass fibers, and organic fibers. They may be used singly or by combining at least two types. The amount of these fillers is arbitrary as long as their addition will not interfere with the purpose of this invention. However, they are generally added in an amount of, at most, 600 parts by weight, based on 100 parts by weight of the organopolysiloxanes, the component (A). Among them, the amount of fumed silica is desirably at most 25 parts by weight. In the case of alumina, the range of 300 to 500 parts by weight is suitable. The appropriate amount of each filler depends upon its oil absorption capacity, surface area, and specific weight.

In order to intensify the strength of the cured products, the resin structured organopolysiloxanes having $SiO_2$ units, $Vi(R')_2$—$SiO_{0.5}$ units, and $R'_3$—$SiO_{0.5}$ units (wherein Vi is a vinyl group and R' is a univalent hydrocarbon group without an unsaturated fat group) may be added (Japanese patent application Kokoku, examined, 38-26771 and Japanese patent application Kokoku, examined, 45-9476). Further, for the control of the curing speed of the compositions, the organopolysiloxanes with Vi(R')SiO units (herein R' is the same as described above) (Japanese patent application Kokoku, examined, 48-10947), acetylene compounds (U.S. Pat. No. 3,445,420), and ionic compounds of heavy metals (U.S. Pat. No. 3,532,649) may be added. In addition, organopolysiloxanes with no functional groups may be added, in order to improve the thermal shock resistance and the flexibility of the cured products.

Further, the following other additives may be added as necessary: agents to improve heat resistance such as cerium oxide; non-inflammable agents such as titanium oxide, benzotriazole, zinc carbonate, and manganese carbonate; addition reaction controlling agents such as siloxanes having vinyl groups and acetylene type compounds; and foaming agents.

The compositions of this invention have a superior stability during room temperature storage, therefore they can be stored for a long time period with all of the components of the organopolysiloxane composition together. Further, they can swiftly form the cured products by heating them to the temperature corresponding to the softening point or the glass transition temperature of the thermoplastic resins, which are used as the capsules' wall material. Since their heat curability is excellent, they are useful as silicone elastomer compositions for pressurized molding methods such as press molding, transfer molding and injection molding. They are also useful as a silicone elastomer and as a silicone gel for use in liquid potting and sealing. Their application is anticipated to be widespread in fields ranging from electricity and electronics to construction.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any manner whatsoever.

In the foregoing and in the following examples, all temperatures are set forth uncorrected in degrees Celsius; and, unless otherwise indicated, all parts and percentages are by weight.

The entire disclosure of all applications, patents and publications, cited above and below, and of corresponding Japanese Application No. 4-285,111, filed Sep. 30, 1992, are hereby incorporated by reference.

EXAMPLES

Below in the examples and the comparison example of this invention, all the parts are expressed by weight parts and viscosity measurements were carried out at 25° C.

Preparation Example 1

Preparation of the capsule A containing organo hydrogen-polysiloxane

Into a five liter capacity flask with a stirrer, 350 g of the thermoplastic silicone resin (softening point 92° C.) which comprises 20 mol % of $(Me_2)SiO_{2/2}$ units, 20 mol % of $(Ph_2)SiO_{2/2}$ units, and 60 tool % of $(Ph)SiO_{3/2}$ units, 250 g of toluene, and 450 g of methylene chloride were dissolved uniformly. Then, 100 g of the organo hydrogen polysiloxane, expressed by the following equation:

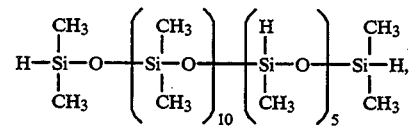

was dissolved to obtain a homogeneous solution.

Then, this solution was continuously sprayed into a spray dryer vessel with nitrogen gas, and 425 g of fine particles of multi-nuclear capsules containing the organo hydrogen polysiloxane was collected using a bag filter. These capsules were further cleaned with 500 g of hexamethyl disiloxane and 418 g of the multi-nuclear capsules A containing the organo hydrogen polysiloxane was collected. The content of the said organo hydrogen polysiloxane within the capsule A was determined to be 18% by the measurement of the SiH amount.

Preparation Example 2

Preparation of the capsule B containing organo hydrogen polysiloxane

A 402 g amount of the capsules B was collected by the similar method as in the preparation example 1, except that the 100 g amount of the organo hydrogen polysiloxane employed in the preparation example 1 was replaced by a 100 g amount of the organo hydrogen polysiloxane expressed by the equation below:

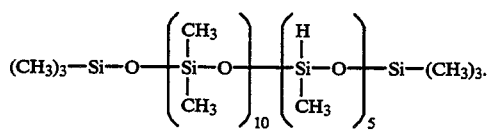

The content of the said organo hydrogen polysiloxane within the capsule B was 16%.

Preparation Example 3

Preparation of the capsule C containing organo hydrogen polysiloxane

In a similar apparatus as in the preparation example 1, 350 g of the thermoplastic silicone resin (softening point 87° C.) which comprises 55 mol % of $(Me_3)SiO_{1/2}$ units and 45 mol % of $SiO_{4/2}$ units, 200 g of toluene, and 600 g of methylene chloride were dissolved uniformly. Then, 100 g of the organo hydrogen polysiloxane, expressed by the following equation:

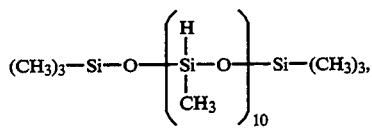

was dissolved to obtain a homogeneous solution.

Then, this solution was continuously sprayed into a spray dryer as in the preparation example 1. After collecting the fine particles with a bag filter and washing them with hexametyl disiloxane, a 431 g amount of the multi-nuclear capsules C containing organo hydrogen polysiloxane was collected. The content of organo hydrogen polysiloxane within the capsule C was 20%.

Example 1

100 Parts of dimethyl polysiloxane of which both molecular ends are blocked with dimethyl vinyl groups and having a viscosity of 5,000 cSt, and 20 parts of a fumed silica surface-treated with trimethyl silyl groups to be hydrophobic and having a specific surface area of 200 $m^2/g$, were heat treated for two hours at 160° C. After cooling this mixture to room temperature, a 0.02 part of a chloroplatinic acid in octanol solution which comprises 2 wt % of platinum was added and mixed uniformly. Then, a curable composition was prepared by mixing the 8.3 parts of the capsules A containing the organo hydrogen polysiloxane and the 7.5 parts of the capsules C containing the organo hydrogen polysiloxane. The composition obtained by the said method was formed by pressing at 120° C. for 10 minutes, then post-curing in an oven at 120° C. for 50 minutes. Physical properties of the obtained sheet are summarized in Table 1. The viscosity of this composition and the physical properties of the similarly prepared sheet, after keeping the composition at 25° C. for one month, are also listed in Table 1.

Comparison Example 1

The 100 parts of the dimethyl polysiloxane used in the example 1, of which both molecular ends are blocked with dimethyl vinyl groups, and the 20 parts of the treated hydrophobic silica also used in Example 1, were heat treated. After cooling, a 0.02 part of the platinum compound of Example 1 was added and mixed uniformly. The procedure up to here was the same as in Example 1.

Then, the addition of the organo hydrogen siloxane at the equivalent amounts as used in Example 1 (the 1.5 parts of the hydrogen siloxane used in the reference Example 1 and the 1.0 part of the hydrogen siloxane used in the reference example 3) caused the gelation during mixing, and the homogeneous mixing was not possible.

TABLE 1

|  | Example 1 | | Comparison Example 1 |
| --- | --- | --- | --- |
|  | Right after preparation | One month later Stored at 25° C. |  |
| Before Curing |  |  |  |
| Viscosity (25° C.) [BH-7-20 rpm] (p) | 860 | 870 | gelation during mixing |
| After Curing [120° C. × 10 min. for press + 120° C. × 50 min. in oven] |  |  |  |
| Hardness (JIS A) | 41 | 41 | unmeasurable |
| Elongation (%) | 400 | 410 | unmeasurable |
| Tensile Strength (kfg/cm²) | 31 | 30 | unmeasurable |

Example 2

100 Parts of dimethyl polysiloxane of which both molecular ends are blocked with dimethyl vinyl groups and having a viscosity of 30,000 cs, 110 parts of a heavy silica powder, 2 parts of hydrophobic fumed silica surface-treated with trimethyl silyl groups and having a specific surface area of 200 $m^2/g$, and 0.1 part of chloroplatinic acid in octanol solution which comprises 2 wt % of platinum was added and mixed uniformly. Further, 13.1 g of the capsules B containing the organo hydrogen polysiloxane was added and homogeneously mixed. The physical properties of this material at the initial stage and after two months of storage at 25° C. are summarized in Table 2.

TABLE 2

|  | Example 2 | |
| --- | --- | --- |
|  | Right after preparation | Two months later Stored at 25° C. |
| Before Curing |  |  |
| Viscosity (25° C.) gelation during [BH-7-20 rpm] (p) | 1850 | 1840 |
| After Curing [120° C. × 10 min. for press + 200° C. × 4 hr. for post-cure] |  |  |
| Density | 1.45 | 1.45 |
| Hardness | 47 | 48 |
| Elongation (%) | 190 | 180 |
| Tensile Strength (kfg/cm²) | 34 | 35 |
| Permanent Deformation by Compression [180° C./22 hr later] (%) | 6 | 6 |

The organopolysiloxane compositions of this invention possess a superior stability during room temperature storage for a long time period, and the heating of the compositions forms a rapid and uniform crosslinking to prepare the cured products.

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

We claim:

1. A heat curable organopolysiloxane composition, which comprises (A) an organopolysiloxane with at least two alkenyl groups within the molecule, (B) capsules, having a size of 1 μm to 1 mm, containing organohydrogen polysiloxanes which comprise (B-1) an organohydrogen polysiloxane with at least two organo hydrogen atoms which are bound to silicon atoms within the organohydrogen polysiloxane molecule and (B-2) a thermoplastic silicone resin comprising $Me_3SiO_{1/2}$ and $SiO_{4/2}$ units, or comprising $PhSi_{3/2}$ units along with $Ph_2SiO$, $Me_2SiO$, $MeSiO_{3/2}$ and/or $MeViSiO$ units, where Me is methyl, Ph is phenyl and Vi is vinyl, and having a softening point or glass transition temperature in the range from 40° to 200° C., wherein the component (B-1) forms a single nucleus or multiple nuclei in the capsules and the component (B-2) is the wall material of the capsules, and (C) a platinum group metallic catalyst.

2. The heat curable organopolysiloxane composition of claim 1, wherein the organopolysiloxane component (A) has a viscosity at 25° C. of 100 to 200,000 cSt.

3. The heat curable organopolysiloxane composition of claim 1, wherein the alkenyl groups of the organopolysiloxane component (A) have 2 to 8 carbon atoms and the organopolysiloxane component (A) further contains monovalent non-alkenyl hydrocarbon groups of 1 to 10 carbon atoms optionally substituted with halogen atoms.

4. The heat curable organopolysiloxane composition of claim 1, wherein the organo hydrogen polysiloxane component (B-1) contains monovalent hydrocarbon groups of 1 to 10 carbon atoms optionally substituted with halogen atoms.

5. The heat curable organopolysiloxane composition of claim 1, wherein the organo hydrogen polysiloxane component (B-1) has a degree of polymerization of 300 or less.

6. The heat curable organopolysiloxane composition of claim 1, wherein the amount of organo hydrogen polysiloxane component (B-1) is sufficient to provide 0.6 to 6.0 SiH groups per each alkenyl group in the organopolysiloxane component (A).

7. The heat curable organopolysiloxane composition of claim 1, wherein the amount of component (B-1) in the capsule (B) is 5 to 60 weight percent.

8. The heat curable organopolysiloxane composition of claim 1, wherein the thermoplastic silicone resin (B-2) comprises 20 to 80 mole % of $PhSiO_{3/2}$ and $MeSi_{3/2}$ units and 80 to 20 mole % of $Ph_2SiO$, $Me_2SiO$ and $MeViSiO$ units.

* * * * *

UNITED STATES PATENT AND TRADEMARK OFFICE
CERTIFICATE OF CORRECTION

PATENT NO. : 5,424,374
DATED : June 13, 1995
INVENTOR(S) : Takehide OKAMI et al.

It is certified that error appears in the above-indentified patent and that said Letters Patent is hereby corrected as shown below:

Claim 8; column 12, lines 23-24: Change "$MeSi_{3/2}$" to read - -$MeSiO_{3/2}$- -.

Signed and Sealed this

Nineteenth Day of September, 1995

Attest:

BRUCE LEHMAN

Attesting Officer

Commissioner of Patents and Trademarks